United States Patent [19]

Abel

[11] 4,428,518

[45] Jan. 31, 1984

[54] GLASS BREAKING TOOL

[75] Inventor: Donald Abel, Morton, Ill.

[73] Assignee: Morton Glass Works, Morton, Ill.

[21] Appl. No.: 312,181

[22] Filed: Oct. 16, 1981

Related U.S. Application Data

[63] Continuation-in-part of Ser. No. 201,719, Oct. 29, 1980, abandoned.

[51] Int. Cl.$^3$ .................... C03B 33/04; C03B 33/12
[52] U.S. Cl. ................................. 225/103; 225/96.5
[58] Field of Search .................. 225/96.5, 103, 93; 83/654, 658

[56] References Cited

U.S. PATENT DOCUMENTS

| | | | |
|---|---|---|---|
| 1,309,970 | 7/1919 | Taylor | 83/654 |
| 1,374,934 | 4/1921 | Lund | 83/654 |
| 1,630,988 | 5/1927 | Tyler | 83/654 X |
| 2,594,901 | 7/1950 | Forster . | |
| 2,814,163 | 11/1957 | Krulwich . | |
| 3,130,884 | 4/1964 | Lintz . | |
| 3,157,329 | 11/1964 | De Gorter . | |
| 3,169,683 | 2/1965 | Pierce . | |
| 3,222,766 | 7/1963 | Camargo . | |
| 3,341,097 | 5/1966 | Fielder . | |
| 3,407,499 | 10/1968 | Rapaport . | |
| 3,507,426 | 2/1968 | Bielen et al. . | |
| 3,519,087 | 7/1970 | Santi . | |
| 3,592,370 | 7/1971 | Boardman . | |
| 3,779,118 | 12/1973 | Habanec | 83/658 X |
| 3,889,862 | 6/1975 | Insolio et al. . | |
| 4,005,808 | 2/1977 | Insolio . | |
| 4,009,813 | 3/1977 | Insolio et al. . | |
| 4,026,262 | 5/1977 | Yasuga . | |
| 4,084,569 | 4/1978 | Chrismas . | |
| 4,247,031 | 1/1981 | Pote et al. . | |

Primary Examiner—Frank T. Yost
Attorney, Agent, or Firm—Bacon & Thomas

[57] ABSTRACT

A tool is disclosed which facilitates the breaking of glass along a score line and is particularly useful for forming glass pieces of irregular shapes, such as those utilized in stained glass art works. The tool has a base on which is mounted a convexly curved fulcrum element. The convexly curved surface of the button provides the fulcrum point when it is placed beneath a glass piece having a score line on its upper surface. A second element of the device is a pressure block having a curved lower surface with generally the same radius of curvature as that of the convexly curved fulcrum element. The pressure block is placed on the upper surface of the glass such that its curved surface straddles the score line and, when the operator exerts a downward force, the glass is caused to fracture along this score line. The device is readily manipulated by the operator and greatly facilitates the cutting of narrow elongated strips of glass, or glass having a curved shape.

22 Claims, 11 Drawing Figures

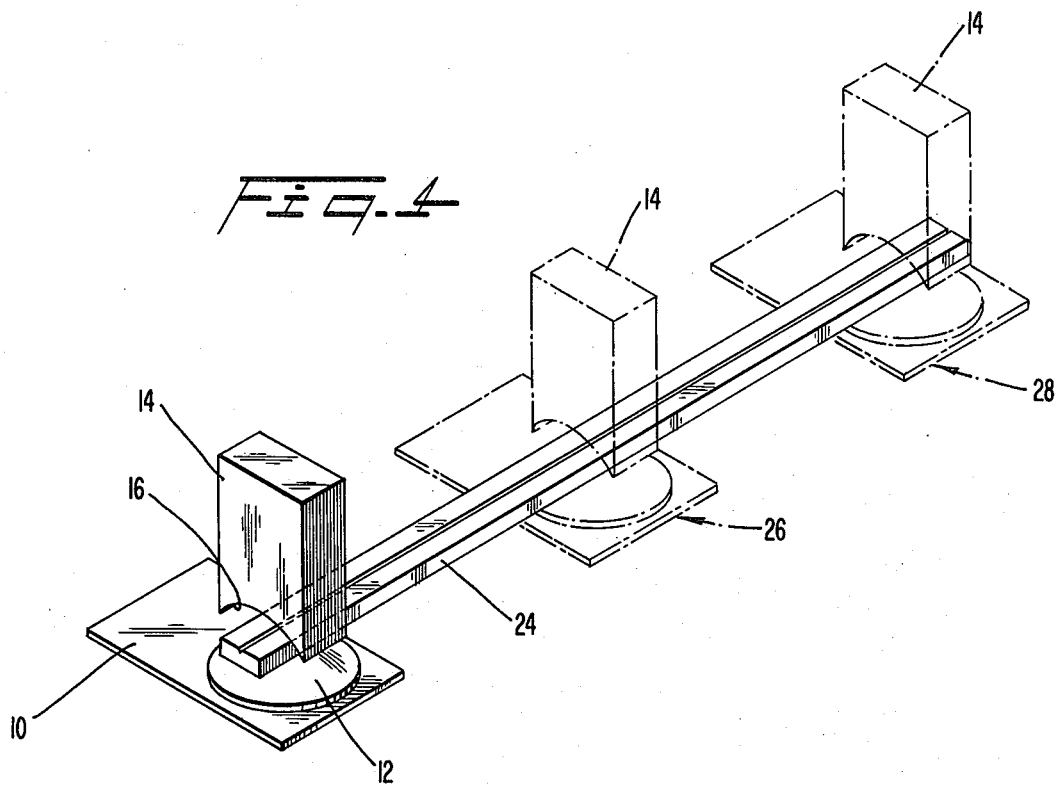
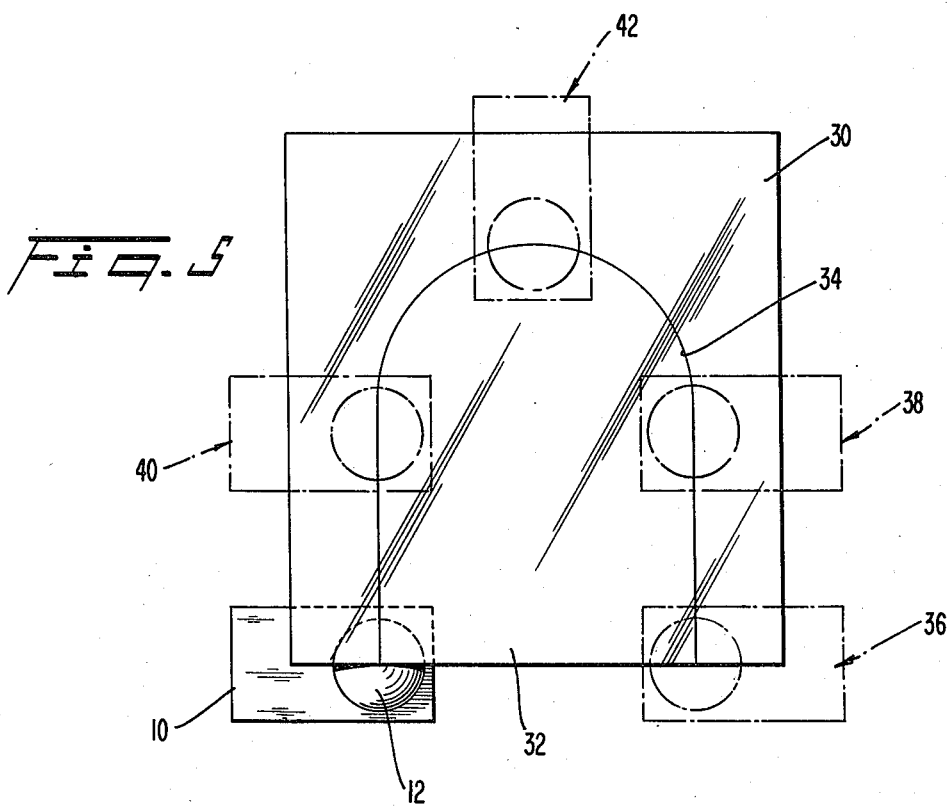

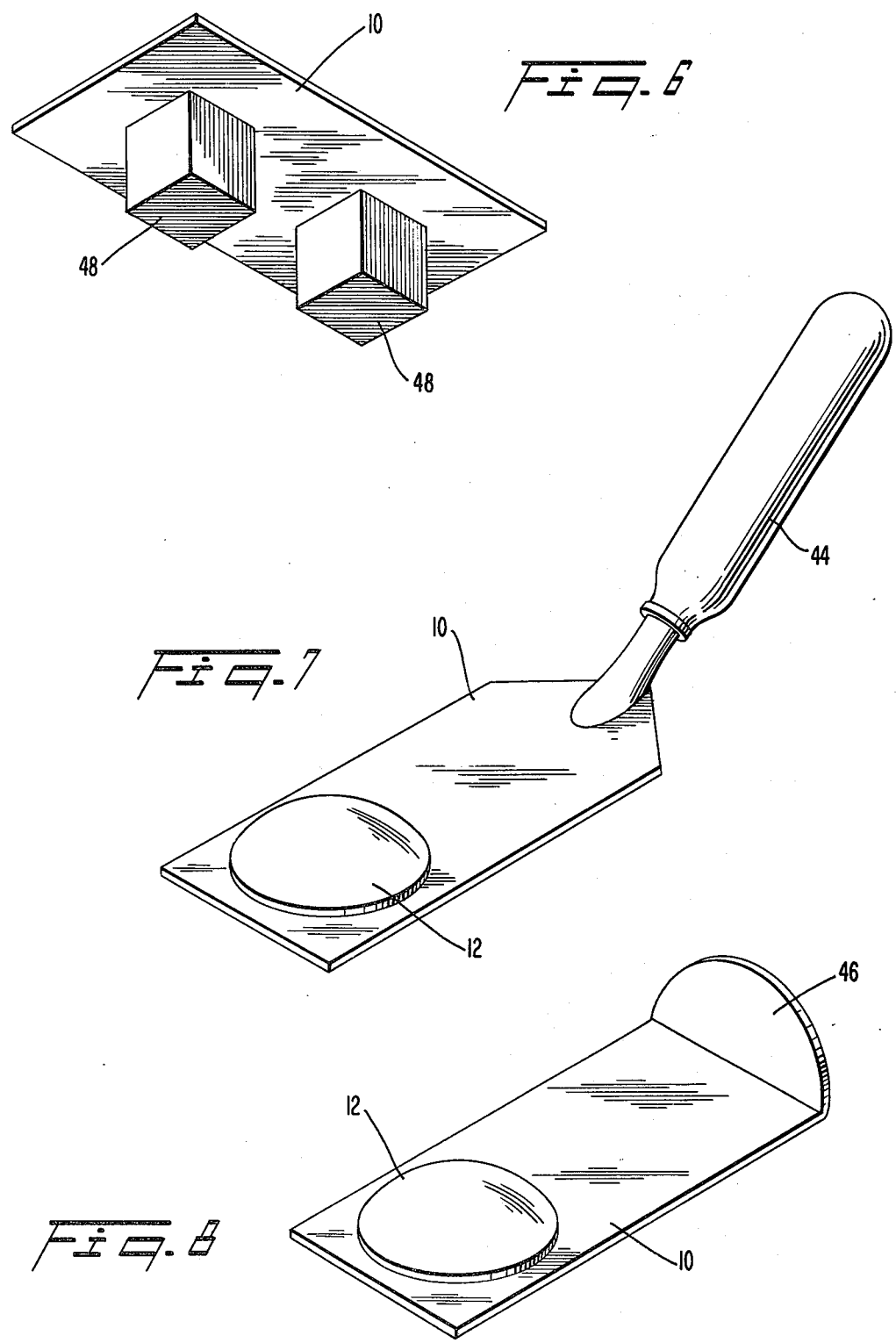

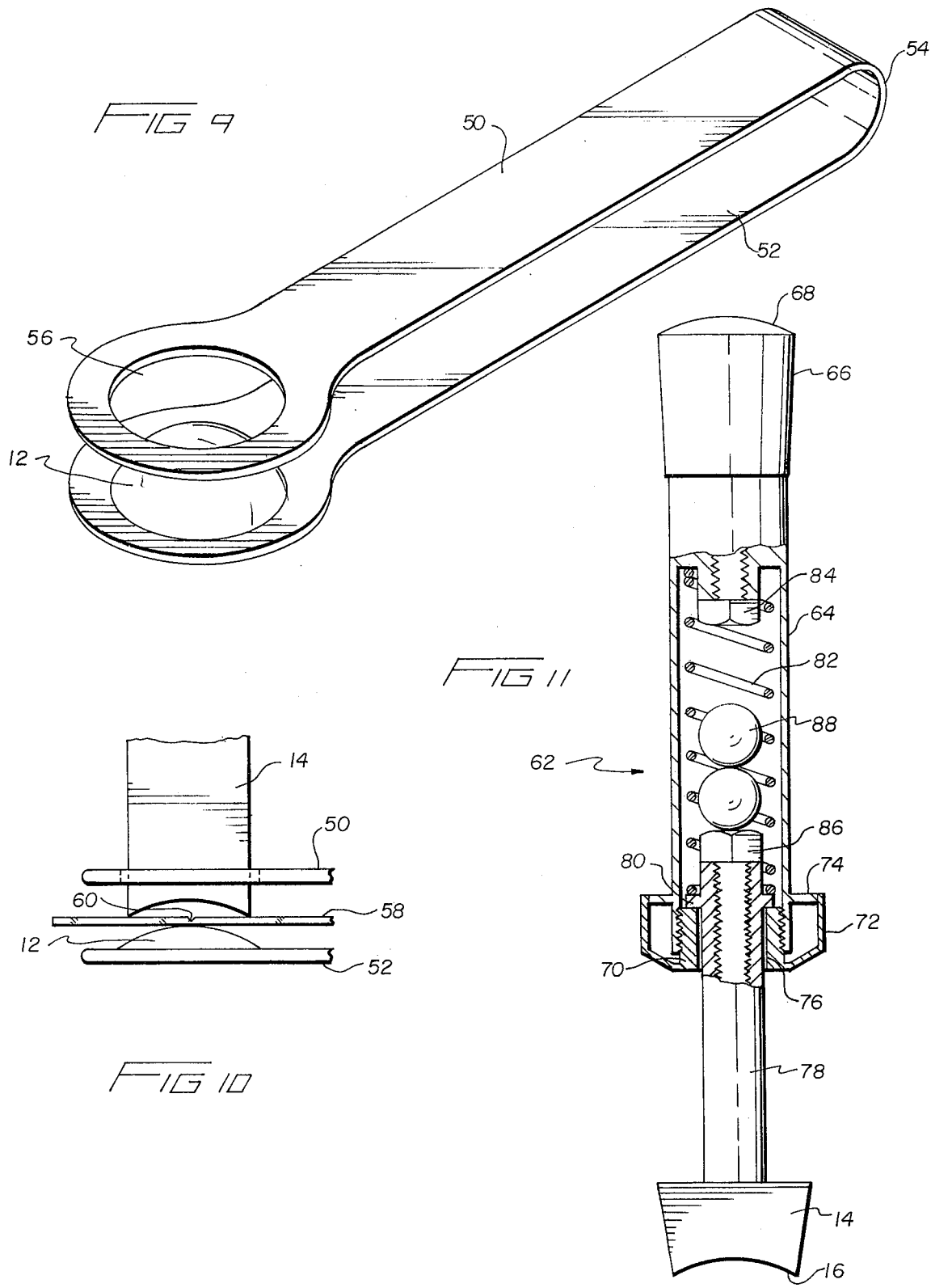

GLASS BREAKING TOOL

RELATED APPLICATIONS

This application is a Continuation-In-Part of Ser. No. 201,719, filed on Oct. 29, 1980 and entitled "GLASS BREAKING TOOL" now abandoned.

FIELD OF THE INVENTION

This invention relates to the field of glass breaking tools, particularly those tools that are manually operable and utilized to cut glass into various shapes as required in creating stained glass art works.

BRIEF DESCRIPTION OF THE PRIOR ART

The concept of cutting glass by first scoring it along a surface, placing it over a fulcrum point and subsequently applying downward force on either side of the score line to cause the glass to fracture along the score line is well-known in the art, and over the years many devices have been developed to facilitate this process. When the size of the glass being cut is relatively large and it is being cut in straight lines, the operator need only place an elongated fulcrum edge below the glass opposite the score line and exert a downward force on either side of the score line to cause the glass to fracture. The fulcrum device typically comprises an elongated member having either circular or triangular cross-section and is placed directly below that score line. Various machinery has been developed over the years which fully automates this process and assures accurate cutting of relatively large pieces of glass, but the basic process has remained the same.

While these devices have been fully satisfactory for commercial installations where the large pieces of glass must be cut accurately and rapidly, they are totally inadequate for use by the hobbyist who creates stained glass art works. This field of endeavor often requires cutting very narrow elongated glass strips and glass pieces having curved, irregular shapes. The cutting of the narrow, elongated strips of glass does not create a problem in utilizing the elongated fulcrum edges of the prior art, but due to the insufficient glass material on either side of the score line, it becomes extremely difficult, in many cases impossible, for the user to manually exert sufficient pressure to cause the glass to break along the score line.

The cutting of the glass into irregular, curved shapes also creates its own set of problems since the fulcrum edges of the prior art do not coincide with the curved score line. Thus, attempts at using the prior art fulcrum edges usually result in the glass breaking in directions other than along the score line, resulting in ruined products and wasted material.

Hand held devices have been developed to enable the user to readily break the glass along the score line. These generally comprise a plier-like device wherein a central raised portion is incorporated in the lower jaw and laterally displaced raised portions are incorporated into the upper jaw, such that when the jaws are closed, the lower raised portion acts as the fulcrum point, while the laterally displaced raised portions exert the breaking force. While these have been generally successful, they are of no value when it comes to breaking very narrow, elongated pieces of glass, or when cutting irregularly shaped curved pieces. The very narrow strips are not wide enough to extend across the jaws so as to contact both raised portions and, thus, it is impossible to exert the requisite fracturing force. These devices also do not facilitate the fracturing of the glass along an irregular curved score line since the reach of the device is limited due to the depth of the jaws. Thus, in many cases, it is simply physically impossible to place the fulcrum and pressure points anywhere near the desired score line.

SUMMARY OF THE INVENTION

The instant invention obviates the above difficulties of the prior art devices and enables the user to successfully break a very narrow, elongated glass piece along a longitudinal score line and to successfully break glass along an irregularly curved score line of any shape. The tool according to the invention comprises a base having a convexly curved fulcrum element attached adjacent to the upper surface near one end of a base, and a pressure block having a curved lower surface with generally the same radius of curvature as that of the convexly curved fulcrum element. Unlike the prior art devices, the curved shape of the fulcrum element provides a fulcrum point rather than a fulcrum edge such that the glass may be fractured along a score line of any shape whatsoever. To utilize the device, the fulcrum element is placed beneath the glass such that it contacts the underside of the glass opposite the score line, and the pressure block is placed on the upper surface of the glass such that its points of contact are on either side of the score line. Increasing the downward pressure on the pressure block causes the glass to fracture at the score line.

Due to the curved surface of the pressure block, the tool may be utilized with any width of glass and will provide sufficient force to cause even a very narrow width glass to fracture along a longitudinal score line. If the piece of glass is extremely long in relation to its width, the fulcrum point may be initially placed at one end and the pressure block brought into play to cause the starting of the fracture along the score line. The fulcrum point and the pressure block are then moved to another location along the length of the glass and pressure is once again exerted on the pressure block to cause the glass to fracture further along the score line. This process is repeated until the entire length of the glass is broken.

Similarly, the tool may be utilized to form irregularly shaped, curved pieces of glass. The fulcrum point is initially placed at one edge of the glass piece beneath the score line whereupon the pressure block is brought into contact to cause the beginning of the fracture. The tool is then moved to another position along the score line and pressure once again is exerted on the pressure block to cause the glass to fracture along the score line. This process is repeated along the length of the score line until the desired shape is obtained.

Thus, by utilizing a fulcrum point, rather than a fulcrum edge, and a curved surface pressure tool to exert the fracturing force, the device can be utilized to fracture glass pieces along any score line.

BRIEF DESCRIPTION OF THE DRAWINGS

FIG. 4 is a perspective view of the glass breaking tool according to the invention being utilized to fracture a relatively narrow, elongated piece of glass having a longitudinal score line.

FIG. 5 is a top elevational view showing the base portion of the tool according to the invention in various positions to fracture a glass piece along a curved score line.

FIG. 6 is a perspective view of a second embodiment of the base portion of the glass breaking tool according to the invention.

FIG. 7 is a perspective view of a third embodiment of the base portion of the glass breaking tool according to the invention.

FIG. 8 is a perspective view of a fourth embodiment of the base portion of the glass breaking tool according to the invention.

FIG. 9 is a perspective view of a fifth embodiment of the base portion of the glass breaking tool according to the invention.

FIG. 10 is a partial side view of the embodiment shown in FIG. 9 in its operative position.

FIG. 11 is a side view, partially in section, of a second embodiment of the pressure block portion of the glass breaking tool according to the invention.

DETAILED DESCRIPTION OF THE PREFERRED EMBODIMENT

Figure 1:
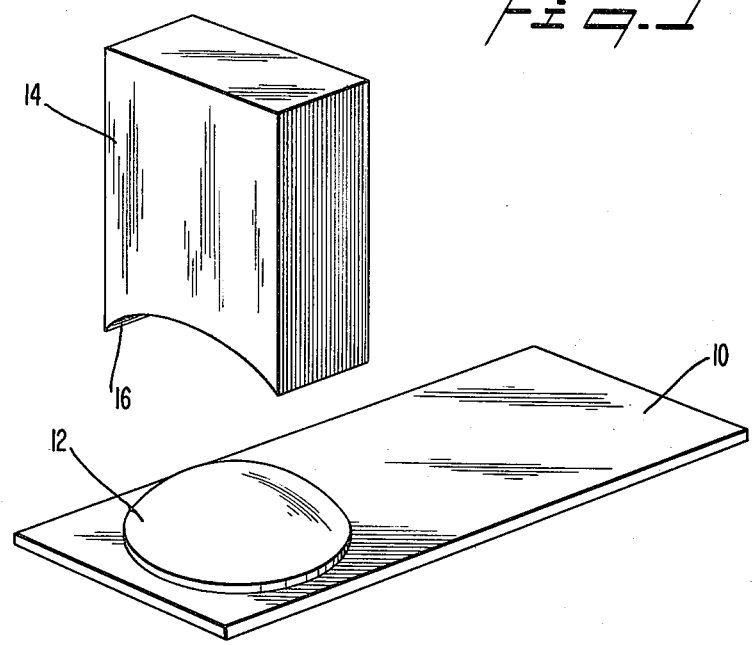
FIG. 1 is a perspective view of the glass breaking tool according to the invention.

The tool according to the invention is shown in perspective in FIG. 1 and comprises a base portion 10 having a convexly curved fulcrum element 12 attached to its upper surface adjacent one end. The convexly curved upper surface may be spherical if desired. A pressure block 14 having a curved, planar lower surface 16 is also included as part of the tool. The pressure block 14 may be fabricated from any material (such as wood, plastic, metal, etc.) that is sufficiently rigid to transmit force to the glass, but which will not cause scratching or otherwise damaging effects to the glass surface. Similarly, the base 10 and fulcrum element 12 may be made of any material (such as wood, plastic, metal, etc.) that is sufficiently rigid to withstand the pressure transferred to it by the pressure block, but which will not mar the surface of the glass.

Figures 2, 3:
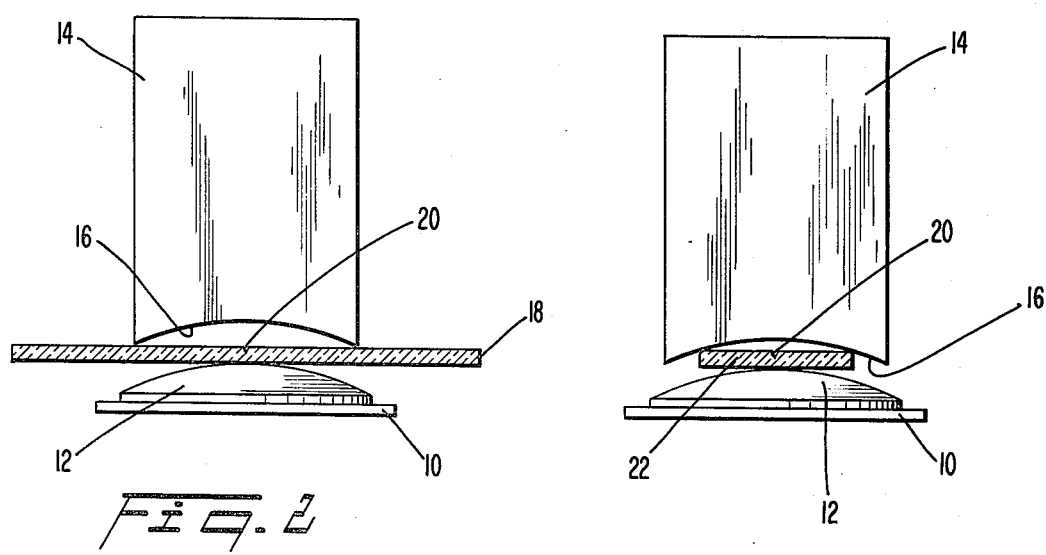
FIG. 2 is a front elevational view of the glass breaking tool of FIG. 1 in position to fracture a relatively wide piece of glass.
FIG. 3 is a front elevational view of the glass breaking tool of FIG. 1 in position to fracture a relatively narrow piece of glass.

The basic function of the tool can best be seen in FIGS. 2 and 3. In FIG. 2, a relatively wide piece of glass 18 having score line 20 extending across its upper surface is placed onto fulcrum element 12 such that the point of contact between it and the fulcrum element is roughly opposite score line 20. Base 10 is placed upon a table, desk or other work surface of sufficient strength to withstand downward force needed to fracture the glass. Pressure block 14 is brought into contact with the upper surface of glass piece 18 such that its downward edges contact the glass on either side of score line 20. Continued downward force exerted on pressure block 14 by the user will cause the glass piece 18 to fracture along score line 20.

The tool according to the invention can be utilized with any width of glass piece, even if the width is narrower than the width of pressure block 14. As best seen in FIG. 3, relatively narrow piece 22 having longitudinal score line 24 is once again placed into position with the fulcrum element 12 contacting the glass opposite the score line. Curved surface 16 will contact the edges of glass piece 22 and, when pressure block 14 is forced downwardly, will cause the glass to fracture along score line 24.

If glass piece 22 is sufficiently long, it may be necessary to position the tool at various points along the length in order to cause it to fracture completely along score line 24. As best shown in FIG. 4, the base 10 is initially positioned beneath one end of glass piece 22 with fulcrum element 12 directly beneath score line 24. Pressure exerted by pressure block 14 causes the glass to fracture at score line 24 to a certain extent along the length of glass piece 22. The tool is then moved along the length of glass piece 22 to a position which has not yet completely fractured along score line 24, as shown in dotted lines 26 in FIG. 4. Similarly, once the score line has been fractured to this point, the tool is then moved along glass piece 22 until a final position 28 is reached at the end of glass piece 22. Although only 3 positions of the tool are shown in FIG. 4, obviously any number of positions may be utilized to sequentially fracture glass piece 22 along score line 24. The tool has proven particularly useful in this regard, since the narrow width of glass pieces such as 22 are often too narrow to be utilized with the plier-type glass breaking devices of the prior art and there is insufficient glass extending on either side of the score line to enable the user to manually grip either side and generate sufficient breaking force.

The tool according to the invention can also be utilized to fracture the glass along a curved score line of any shape. The technique for achieving this is illustrated in FIG. 5 wherein it is desired to separate glass pieces 30 and 32 along curved score line 34. Curved score line 34 is shown as a generally "u" shape, which heretofore has been thought to be impossibly difficult. However, it can easily be achieved by utilizing the instant tool. Although curved score line 34 is shown in a "U" shape, the principles discussed below can be utilized to fracture glass along any curve, regardless of shape.

The base 10 with fulcrum element 12 is initially placed beneath one edge of the glass piece at which the curved score line 34 originates. This is shown in solid lines in FIG. 5. The pressure block 14 (not shown in FIG. 5 for the purposes of clarity) is brought into contact with the upper surface of the glass and pressed downwardly causing a fracturing thereof partially along the score line. The base is then moved to the opposite end of the score line, identified as position 36 in dotted lines in FIG. 5. The pressure block 14 is once again utilized to begin the fracture along this end of the score line. The tool is then moved to position 38 and exertion of force on pressure block 14 causes the complete fracture to extend further along the score line 34. An extension of the complete fracture is similarly achieved by repositioning the tool to position 40 on the opposite leg of the score line. Finally, the tool is positioned at position 42 to complete the fracture along score line 34. Although only 5 positions of the tool are shown in FIG. 5, it should be evident that any number of positions may be utilized depending upon the length and shape of the score line. However, regardless of the number of positions, the technique of moving the fulcrum point along the score line and causing partial fracturing therealong is constant regardless of shape or length of the score line.

Base 10 of the tool according to the invention may be a flat piece, as shown in FIG. 1, or may have handles either attached thereto or formed integrally therewith.

FIG. 7 shows a modified embodiment of the invention wherein handle 44 is attached to base 10 any known means. The handle 44 greatly facilitates the manipulation of the device by the user. Other handle means, such as 46, may be formed integrally with the base 10 as shown in FIG. 8. Also, the lower surface of base 10 may have protrusions 48 extending therefrom to enable the use of the device with the glass cutting device shown and described in applicant's co-pending application (Ser. No. 201,718, filed Oct. 29, 1980 now abandoned, and Ser. No. 318,450 filed Nov. 5, 1981) entitled "Apparatus for Cutting Glass Into Various Shapes". In that apparatus, an egg-crate cutting surface is utilized to support the glass during the cutting operation and to serve as a locator for various work stops and guides. The protrusions 48 extending from the lower surface of base 10 will fit into the egg crate indentations so as to accurately position the tool on the egg crate surface. Although the two protrusions 48 are shown in generally cubical form, obviously their shape will conform to the cross-sectional shape of the perforations used in the glass supporting work surface, and their number may be varied without exceeding the scope of this invention.

Cutting opaque or translucent glass presents a problem to the user of the instant invention since it is difficult to properly position the fulcrum element with respect to the score line and to portion the pressure block with respect to the fulcrum element. To obviate this problem, the fulcrum element 12 may be attached to a locating device and guide as shown in FIGS. 9 and 10. As can be seen, the guide comprises two generally parallel arms 50 and 52 joined at one end by portion 54. The distal end of arm 52 may be enlarged such that fulcrum element 12 may be attached thereto. Upper arm 50 also has an enlarged distal end portion with opening 56 therethrough located immediately above and aligned with fulcrum element 12. In use, the guide is oriented such that arms 50 and 52 are disposed on opposite sides of glass piece 58, as shown best in FIG. 10. Since glass piece 58 is assumed to be opaque or translucent, the user will be able to properly locate the fulcrum element 12 below scoreline 60 by viewing through opening 56 in upper arm 50. Once the user has located score line 60 approximately at the midpoint of opening 56, pressure block 14 is inserted through this opening and pressed downwardly so as to cause the glass piece to fracture along the scoreline 60.

An alternative embodiment of the pressure block is shown in FIG. 11. In this embodiment, the pressure block 14 (having the curved, planar lower surface 16) is attached to an impact tool handle structure, illustrated generally at 62. The impact tool structure comprises handle housing 64 which has a generally circular cross-section and is hollow throughout a major portion of its interior as shown. Housing 64 may have an enlarged, upper portion 66 with curved upper surface 68 attached to the upper end thereof which facilitates handling and manipulation by the user. The lower end of handle housing 64 is threadingly engaged with annular flange 70 formed integrally with collar 72. Collar 72 also has a generally circular cross-section and may be formed so as to closely surround radially extending flange 74, formed as part of handle housing 64. Collar 72 has opening 76 formed therethrough concentric with its central axis, the size of opening 76 being slightly larger than the outer diameter of shaft 78 which passes therethrough. This allows shaft 78 to slide with respect to handle housing 64 and collar 72 as will be hereinafter explained in more detail. Pressure block 14 is rigidly attached to the distal end of shaft 78 by any known means. The opposite end of shaft 78 extends into handle housing 64 and has radially extending flange 80 which, at the extreme position, bears against the upper surface of annular flange 70. Compression spring 82 extends between the upper end of handle housing 64 and radial flange 80 and serves to bias shaft 78 in an outward direction, away from handle housing 64.

The upper end of compression spring 82 surrounds upper anvil portion 84, which may be formed integrally with handle housing 64. Upper anvil portion 84 is formed of a rigid material which is capable of transmitting force generated by the movement of handle housing 64 with respect to shaft 78 as will be hereinafter explained in detail. As shown in FIG. 11, upper anvil portion 84 may take the form of a metal bolt which is threaded into handle housing 64. Quite obviously, any other known means may be utilized as long as it is capable of transmitting force without significant compression. Similarly, a lower anvil portion 86 is located on the upper end of shaft 78. Again, lower anvil portion 86 should be made of a material that is capable of transmitting force without significant compression and may also take the form of a bolt or like structure. In this instance, the bolt may be either threadingly engaged with shaft 78, or may extend completely through shaft 78 and be threadingly engaged with pressure block 14.

To operate the pressure block of this embodiment, it is placed on the glass as previously described with curved, planar surface 16 oriented generally perpendicularly across the score line. Once in position, the operator pushes downwardly on handle housing 64 such that upper anvil portion 84 contacts lower anvil portion 86 and transmits a downward force to pressure block 14. This force causes the glass to break along its score line. In order to alter or minimize the length of the downward stroke of handle housing 64, one or more force-transmitting spacer members 88 may be interposed between upper and lower anvil portions 84 and 86. These spacer members should be made of a rigid material that is capable of transmitting force without significant compression. Typically, these spacer members may be metallic ball bearings or similar elements. Although two such spacer members are shown in the drawings, any number may be utilized depending upon the requirements of the user. The spacer elements may be quite easily installed and removed simply by unthreading collar 72 from handle housing 64 and removing the collar and shaft 78 from the handle. Spacer elements 88 are loosely retained in the interior of compression spring 82 such that they may be easily inserted and removed. The upper portion 66 of handle housing 64 may be weighted if desired so as to minimize the force input required of the user. The precise form and installation of such weights may be by any known means. This embodiment may, of course, be utilized in combination with any of the fulcrum elements previously described.

The foregoing is provided for descriptive purposes only and should not be construed as in any way limiting the scope of this invention which is solely defined by the appended claims.

I claim:

1. A tool for fracturing glass along a score line comprising a base having a surface which is convexly curved in all directions from a central axis, the surface forming a fulcrum element wherein said fulcrum element makes point contact with the glass opposite the score line, and a pressure block with a concavely curved planar lower surface having a generally similar radius of curvature as the fulcrum element, wherein the pressure block contacts the glass on opposite sides of the score line such that a force exerted on the pressure block toward the fulcrum element causes the glass to fracture at the score line.

2. The tool of claim 1 further comprising handle means attached to the base to facilitate manipulation by the user.

3. The tool of claims 1 or 2 wherein the pressure block is made of a rigid material that will not mar the surface of the glass.

4. The tool of claim 3 wherein said material is wood.

5. The tool of claim 3 wherein said material is plastic.

6. The tool of claim 3 wherein said material is metal.

7. The tool of claims 1 or 2 wherein the fulcrum element is made of a rigid material that will not mar the surface of the glass.

8. The tool of claim 7 wherein said material is wood.

9. The tool of claim 7 wherein said material is plastic.

10. The tool of claim 7 wherein said material is metal.

11. The tool of claim 1 further comprising at least one projection extending from the lower surface of the base to engage upwardly opening projections in a glass cutting surface.

12. The tool of claims 1 or 2 wherein the convexly curved surface of the fulcrum element is generally semispherical in shape.

13. The tool of claims 1 or 2 further comprising handle means attached to said pressure block to facilitate manipulation by the user.

14. The tool of claim 13 wherein said handle means is movable with respect to said pressure block.

15. The tool of claim 14 wherein said handle means comprises (a) a shaft attached to said pressure block; (b) a handle housing slidingly attached to said shaft; (c) lower anvil means attached to said shaft; and, (d) upper anvil means attached to said handle housing such that sliding movement of the handle housing with respect to said shaft brings the upper and lower anvils into contact so as to transmit a force to said pressure block through the shaft.

16. The tool of claim 15 further comprising spring means interposed between the shaft and the handle housing so as to normally bias the upper and lower anvils apart.

17. The tool of claim 16 wherein said spring means is a compression spring.

18. The tool of claim 16 further comprising force transmitting spacer means located between the upper and lower anvils.

19. The tool of claim 18 wherein said spring means is a helical compression spring and said force transmitting spacer means is located within the spring.

20. The tool of claim 14 wherein the handle means is weighted so as to minimize the input force required of the user.

21. The tool of claim 2 wherein said handle means comprises a locating portion for properly locating the pressure block with respect to the fulcrum element.

22. The tool of claim 21 wherein said handle means comprises a lower arm on which the fulcrum element is located adjacent a first end; an upper arm disposed above and generally parallel to the lower arm, the upper arm having an opening through a first end disposed above the fulcrum element; and, means interconnecting the upper and lower arms at their second ends.

* * * * *